US010609994B2

(12) United States Patent
Vanderminden

(10) Patent No.: US 10,609,994 B2
(45) Date of Patent: Apr. 7, 2020

(54) NESTABLE AND STACKABLE UMBRELLA BASES

(71) Applicant: Telescope Casual Furniture, Inc., Granville, NY (US)

(72) Inventor: William M. Vanderminden, Queensbury, NY (US)

(73) Assignee: Telescope Casual Furniture, Inc., Granville, NY (US)

( * ) Notice: Subject to any disclaimer, the term of this patent is extended or adjusted under 35 U.S.C. 154(b) by 0 days.

(21) Appl. No.: 15/989,791

(22) Filed: May 25, 2018

(65) Prior Publication Data

US 2019/0360229 A1 Nov. 28, 2019

(51) Int. Cl.
*A45B 23/00* (2006.01)
*F16M 13/00* (2006.01)
(Continued)

(52) U.S. Cl.
CPC ......... *A45B 23/00* (2013.01); *E04H 12/2246* (2013.01); *E04H 15/28* (2013.01); *F16M 13/00* (2013.01); *A45B 2023/0012* (2013.01)

(58) Field of Classification Search
CPC . A45B 23/00; A45B 2023/0012; A45B 25/00; A45B 3/00; A45B 2200/1009;
(Continued)

(56) References Cited

U.S. PATENT DOCUMENTS 3,038,688 A * 6/1962 Thorburn ............... A47G 33/12
248/523
3,119,588 A * 1/1964 Keats ...................... E01F 13/02
116/173
(Continued)

FOREIGN PATENT DOCUMENTS

CN 204629001 9/2015

OTHER PUBLICATIONS

William Vanderminden, Nestable and Stackable Umbrella Bases, design U.S. Appl. No. 29/648,985, filed May 25, 2018.
(Continued)

*Primary Examiner* — Winnie Yip
(74) *Attorney, Agent, or Firm* — Heslin Rothenberg Farley and Mesiti PC

(57) ABSTRACT

An umbrella base includes a body having a central passageway therethrough, an upper surface having a first configuration, a lower surface having a second configuration, and an outer peripherally-extending surface extending between the upper surface and the lower surface. The first configuration of the upper surface and the second configuration of the lower surface are correspondingly sized and configured so that when a second umbrella base is vertically stacked on top of and rested on the umbrella base, the first configuration of the upper surface of the umbrella base fits within the second configuration of the lower surface of the second umbrella base, and when the umbrella base is vertically stacked on top of and rested on the second the umbrella base, the first configuration of the upper surface of the second umbrella base fits within portions of the second configuration of the lower surface of the umbrella base.

33 Claims, 13 Drawing Sheets

(51) Int. Cl.
*E04H 12/22* (2006.01)
*E04H 15/28* (2006.01)

(58) Field of Classification Search
CPC ..... A45B 25/22; E04H 17/22; E04H 12/2238; E04H 12/2246; F16M 13/00
USPC .................. 135/15.1, 16, 98, 118, 902, 905; 248/156, 158, 523, 530, 532, 545, 910, 248/188.1, 188.4; D3/5–6, 10; 40/606.01, 607.1
See application file for complete search history.

(56) References Cited

U.S. PATENT DOCUMENTS

| | | | |
|---|---|---|---|
| 3,415,475 A * | 12/1968 | Goodman | F16M 11/22 248/158 |
| 5,354,031 A * | 10/1994 | Bilotti | E04H 12/2238 248/511 |
| 5,497,972 A * | 3/1996 | Sofy | A47F 5/04 248/523 |
| D397,417 S | 8/1998 | Jane et al. | |
| 6,010,108 A | 1/2000 | Welzen | |
| 6,113,054 A | 9/2000 | Ma | |
| D447,649 S | 9/2001 | Mason | |
| 6,299,124 B1 | 10/2001 | Reback et al. | |
| 6,367,494 B1 * | 4/2002 | Tung | E04H 12/2238 135/44 |
| 6,446,930 B1 * | 9/2002 | Li | E04H 12/2238 135/15.1 |
| D465,988 S | 11/2002 | Green | |
| D470,305 S | 2/2003 | Clarke | |
| 6,547,072 B2 | 4/2003 | Whiting et al. | |
| D475,995 S | 6/2003 | Hsieh | |
| D483,131 S | 12/2003 | Tsai | |
| D484,303 S | 12/2003 | Taylor | |
| D485,055 S | 1/2004 | Taylor | |
| D487,163 S | 2/2004 | Humphrey | |
| 6,755,311 B2 | 6/2004 | Berry | |
| 6,869,058 B2 * | 3/2005 | Tung | E04H 12/2238 248/519 |
| D516,297 S | 3/2006 | Smith et al. | |
| D522,492 S * | 6/2006 | Carbone | D14/211 |
| 7,186,192 B1 | 3/2007 | Suissa | |
| D568,603 S | 5/2008 | Smith et al. | |
| 7,600,734 B2 | 10/2009 | Clarke | |
| 7,614,600 B1 * | 11/2009 | Smith | G09F 23/00 135/16 |
| D622,443 S | 8/2010 | Huang | |
| D623,500 S | 9/2010 | Langner | |
| D641,435 S | 7/2011 | Coote | |
| D654,296 S | 2/2012 | Shook | |
| D679,169 S | 4/2013 | Else | |
| D697,705 S | 1/2014 | Ma | |
| 8,632,045 B2 | 1/2014 | Ma | |
| 8,899,249 B2 | 12/2014 | Lai | |
| D732,817 S | 6/2015 | Elstow | |
| 9,108,086 B1 | 8/2015 | Weck | |
| D740,546 S | 10/2015 | DeVaney | |
| 9,200,655 B2 | 12/2015 | Pan | |
| D752,335 S | 3/2016 | Stedman | |
| 9,376,832 B2 * | 6/2016 | Deering | E01F 13/022 |
| D768,978 S | 10/2016 | Ma | |
| D771,935 S | 11/2016 | Ma | |
| D775,461 S | 1/2017 | Ma | |
| 9,717,974 B2 | 8/2017 | Hahn et al. | |
| D817,631 S | 5/2018 | Weng | |
| 10,017,955 B2 | 7/2018 | Ye | |
| 10,030,889 B2 | 7/2018 | Merritt | |
| 10,100,969 B1 | 10/2018 | Zhu | |
| D833,023 S | 11/2018 | Maletic | |
| D833,136 S | 11/2018 | Ma | |
| D835,459 S | 12/2018 | Sedgwick | |
| D855,967 S | 8/2019 | Ma | |
| 2003/0111657 A1 | 6/2003 | Green | |
| 2004/0108439 A1 | 6/2004 | Ma | |
| 2013/0017937 A1 | 1/2013 | Guarrasi | |

OTHER PUBLICATIONS

Umbrella Base, designed by Oliver Joen-an Ma, photographs of top view and bottom view, corresponding to Design U.S. Pat. No. D. 771,935, 2-page, at least as early as Nov. 22, 2016.
Grosfillex Umbrella Base—Features and Benefits, available from http://www.altantafixture.com/itemdetail.aspx/2355/Grossfillex/35-LB- . . . , printed Apr. 26, 2018, 3-pages.
MyUmbrellaShop.com, 70lb Plastic Concrete Filled Umbrella Base, https://www.myumbrellashop.co,/product/70-lb-plastic-concrete-filled- . . . , printed Apr. 26, 2018, 2-pages.
Telescope Casual 2018 Catalog, Telescope Casual Furniture, Inc., Granville, New York, 100 pages, Jul. 1, 2017.
Telescope Casual 2017 Catalog, Telescope Casual Furniture, Inc., Granville, New York, 100 pages, Jul. 1, 2016.
13 16-inch Weighted Base with Handle, manufactured by USWeight, aka. Escalade Sports, Telescope Casual 2018 Catalog, p. 72, at least as early as Fall 2016.
13 17-inch Weighted Patio Base 45 lbs, manufactured by SDM, Canada, and #23 20-inch Weighted Market Base, manufactured by SDM, Telescope Casual 2008 Catalog, p. 64, 2008.
12 24-inch Square Steel Market Base 55 lbs and #120WGT 24-inch Square Steel Add-on Weight 55 lbs, Telescope Casual 2017 Catalog, p. 72, Fall 2016.

* cited by examiner

1

NESTABLE AND STACKABLE UMBRELLA BASES

CROSS-REFERENCE TO RELATED APPLICATION(S)

This application is related to commonly assigned, co-pending design patent application Ser. No. 29/648,985, filed May 25, 2018, by William M. Vanderminden and entitled "Umbrella Base," which is hereby incorporated in its entirety herein by reference.

FIELD OF THE DISCLOSURE

The present disclosure is directed generally to patio umbrellas, and more particularly to nestable and stackable umbrella bases for supporting patio umbrellas.

BACKGROUND

Large umbrellas such as patio umbrellas typically are connected to an umbrella base to maintain the umbrella in an upright position. Conventional umbrella bases are typically made from a single piece of cast iron or cast aluminum, or formed form a hollow plastic material having a weighting material disposed therein.

SUMMARY

Shortcomings of the prior art are overcome and additional advantages are provided through the provision, in one embodiment, of a nestable and stackable umbrella base for use with a base tube in supporting a lower end of an elongated support of an umbrella assembly. The nestable and stackable umbrella base includes, for example, a body having a central passageway therethrough for receiving the base tube for supporting the lower end of the elongated support of the umbrella assembly. The body has an upper surface having a first configuration and a lower surface having a second configuration. The body includes an outer peripherally-extending surface extending between the upper surface and the lower surface. The first configuration of the upper surface and the second configuration of the lower surface being correspondingly sized and configured so that when a second umbrella base is vertically stacked on top of and rested on the umbrella base with the central passageways vertically aligned and the outer peripherally-extending surfaces vertically aligned, portions of the first configuration of the upper surface of the umbrella base vertically fits within portions of a second configuration of a lower surface of the second umbrella base. The first configuration of the upper surface and the second configuration of the lower surface being correspondingly sized and configured so that when the umbrella base is vertically stacked on top of and rested on the second umbrella base with the central passageways vertically aligned and the outer peripherally-extending surfaces vertically aligned, portions of a first configuration of an upper surface of the second umbrella base fits within portions of the second configuration of the lower surface of the umbrella base.

In another embodiment, a nestable and stackable umbrella base for use with a base tube in supporting a lower end of an elongated support of an umbrella assembly is provided. The nestable and stackable umbrella base includes, for example, a body having an upper portion, a bottom portion, and a peripherally-extending portion extending between the upper portion and the bottom portion. The upper portion includes a raised upper central surface, a recessed lower surrounding surface, and an outer vertically-extending surface disposed between the raised upper central surface and the lower surrounding surface. The bottom portion includes a recessed lower central portion, a surrounding peripheral portion, and an inner vertically-extending surrounding edge extending between the recessed lower central portion and the lower surrounding portion. The body has a passageway extending therethrough having an upper aperture opening onto an upper surface of the raised central portion and a lower aperture opening onto a lower surface of the recessed central portion. The passageway operable for receiving the base tube for receiving the lower end of the elongated support of the umbrella assembly. The raised central portion and the recessed central portion are correspondingly sized and configured so that when the umbrella base and a second umbrella base are vertically stacked together with the passageways vertically aligned, a lower surrounding portion of a bottom portion of the second umbrella base is disposable adjacent to the lower surrounding portion of the upper portion of the umbrella base, and the raised upper central portion of the umbrella base is disposed in a recessed lower central portion of the second umbrella base.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the disclosure in detail. It should be understood, however, that the detailed description and the specific examples, while indicating embodiments of the present disclosure, are given by way of illustration only, and are not by way of limitation. Various substitutions, modifications, additions and/or arrangements within the spirit and/or scope of the underlying concepts will be apparent to those skilled in the art from this disclosure. Reference is made below to the drawings, which are not drawn to scale for ease of understanding, wherein the same reference numbers used throughout different figures designate the same or similar components.

Figure 1:
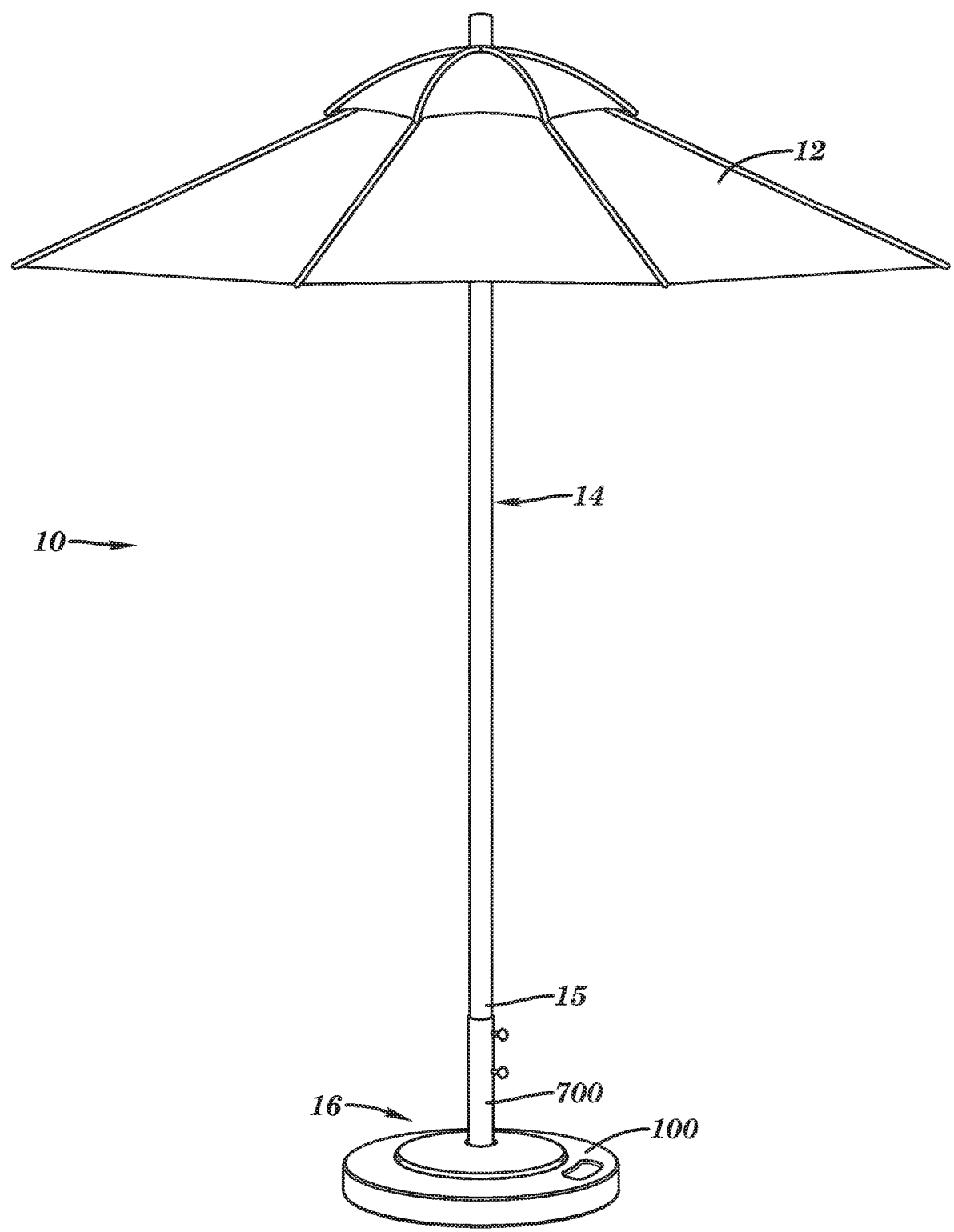
FIG. 1 is a perspective view of an umbrella assembly and an umbrella base assembly according to an embodiment of the present disclosure.

FIG. 1 illustrates an umbrella assembly 10 having an umbrella canopy 12, an elongated support or pole 14, and an umbrella base assembly 16 having a nestable and stackable umbrella base 100 and a base tube assembly 700 according to an embodiment of the present disclosure. The umbrella assembly may further include a rib assembly, a tilt mechanism, and a crank housing and a handle (not shown in FIG. 1). Umbrella base 100 is operable for use in supporting a lower end 15 of pole 14 to support umbrella assembly 10 in an upright orientation. As will be appreciated from the discussion below, a plurality of the nestable and stackable umbrella bases may be provided to allow a user to use one or more of such nestable and stackable umbrella bases to adjust the total weight of the resulting umbrella base assembly, thereby allowing use of an umbrella in different environments.

Figure 2:
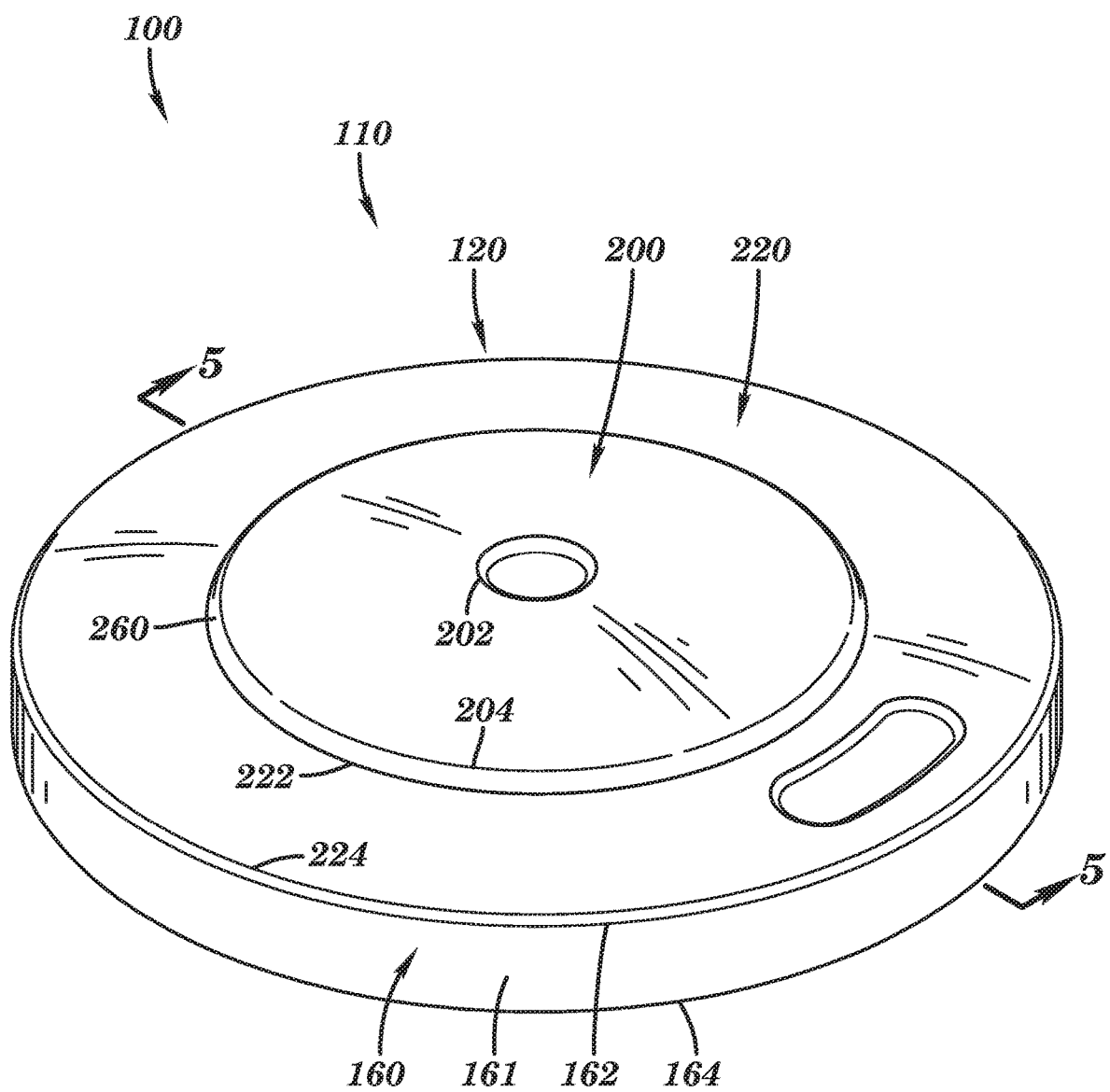
FIG. 2 is an enlarged top perspective view of the umbrella base of FIG. 1.
Figure 3:
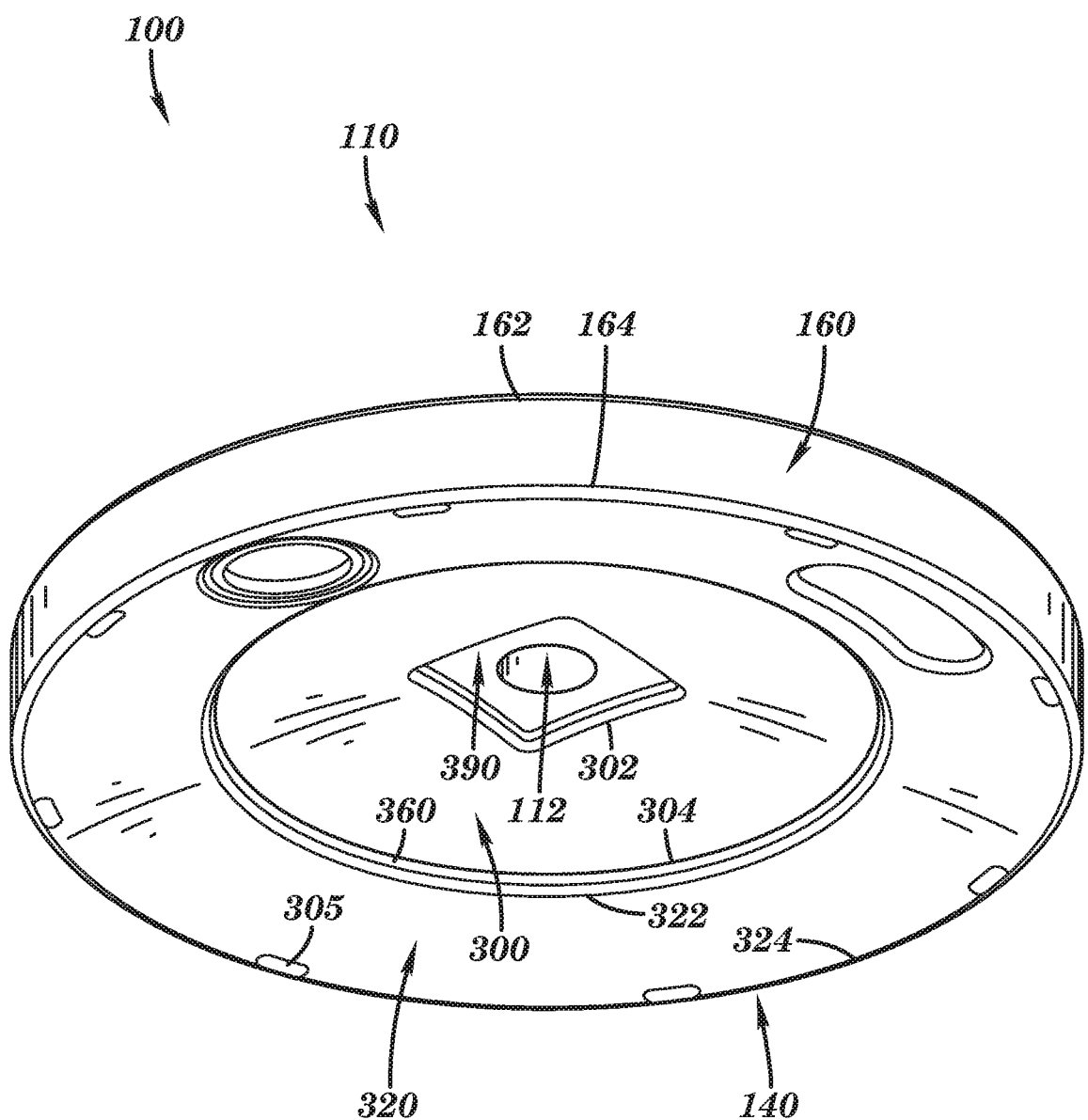
FIG. 3 is an enlarged bottom perspective view of the umbrella base of FIG. 1.

With reference to FIGS. 2 and 3, umbrella base 100 may include a body 110 such as a weighted body having an upper portion 120 (FIG. 2), a bottom portion 140 (FIG. 3), and a peripherally-extending portion 160 extending between the upper portion and the bottom portion. In this illustrated embodiment, umbrella base 100 may have a generally disk-shaped configuration.

As shown in FIG. 2, upper portion 120 includes a raised central surface 200 and an offset lower peripherally-extending surrounding surface 220. Raised central surface 200 includes an inner surrounding edge 202 and an outer surrounding edge 204. Lower peripherally-extending surrounding surface 220 includes an inner surrounding edge 222 and an outer surrounding peripheral edge 224. A generally vertically-extending connecting surface 260 extends between the raised central surface and the lower peripherally-extending surrounding surface. Outer surrounding peripheral edge 224 of lower peripherally-extending surrounding surface 220 is joined to an upper peripherally-extending edge 162 of peripherally-extending portion 160.

As shown in FIG. 3, bottom portion 140 includes a recessed central surface 300 and an offset peripherally-extending surrounding surface 320. Recessed central surface 300 includes an inner surrounding edge 302 and an outer surrounding edge 304. Peripherally-extending surrounding surface 320 includes an inner surrounding edge 322 and an outer surrounding peripheral edge 324. A generally vertically-extending connecting surface 360 extends between the recessed central surface and the peripherally-extending surrounding surface. Outer surrounding peripheral edge 324 of peripherally-extending surrounding surface 320 is joined to a lower peripherally-extending edge 164 (FIG. 2) of peripherally-extending portion 160.

Figure 4:
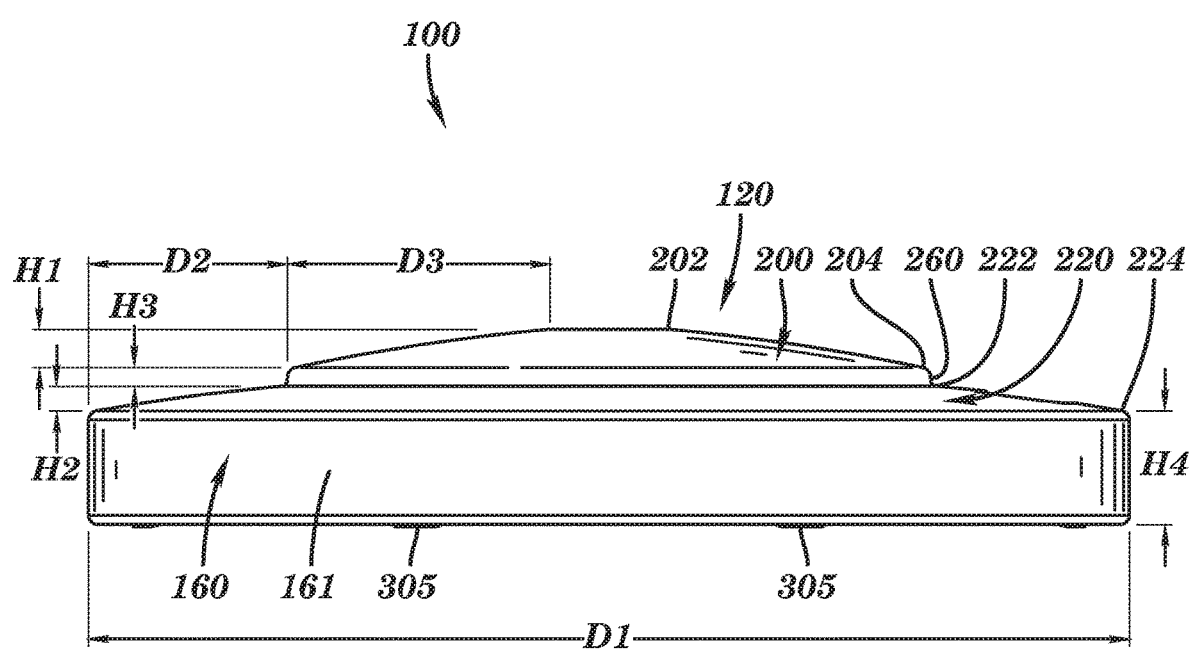
FIG. 4 is an enlarged elevational view of the umbrella base of FIG. 1.

With reference to FIG. 4, upper portion 120 of umbrella base 100 may include raised central surface 200 having inner surrounding edge 202 disposed at a higher elevation compared to outer surrounding edge 204. For example, inner surrounding edge 202 may be disposed a vertical height H1 above outer surrounding edge 204. In some embodiments, a raised central surface may angle downwardly from an inner surrounding edge to an outer surrounding edge. For example, a raised central surface may be a conical surface. In some embodiments, a raised central surface may be a convex surface. In still other embodiments, a raised central surface may include a combination of conical and convex surfaces.

Upper portion 120 of umbrella base 100 may include lower peripherally-extending surrounding surface 220 having inner surrounding edge 222 disposed at a higher elevation compared to outer surrounding peripheral edge 224. For example, inner surrounding edge 222 may be disposed a vertical height H2 above outer surrounding peripheral edge 224. In some embodiments, a lower peripherally extending surrounding surface may angle downwardly from an inner surrounding edge to an outer surrounding edge. For example, such a lower peripherally extending surrounding surface may be a conical surface. In some embodiments, a lower peripherally-extending surrounding surface may define a convex surface. In still other embodiments, a lower peripherally-extending surrounding surface may include a combination of conical and convex surfaces. Vertically-extending connecting surface 260 may have a vertical height H3. Vertical heights H1, H2, and H3 may be the same or different. For example, vertical height H1 may be about 0.77 inch, vertical height H2 may be about 0.5 inch, and vertical height H3 may be about 0.37 inch. Peripherally-extending portion 160 may have a vertical height H4 of about 2.3 inches. A diameter D1 of an outer surface 161 of peripherally-extending portion 160 may be about 21 inches. A radial distance D2 between vertically-extending connecting surface 260 to outer surface 161 to may be about 4 inches, and the radial distance D3 from vertically-extending connecting surface 260 to the upper portion of passageway 112 (FIG. 3) is about 5.4 inches.

Figure 5:
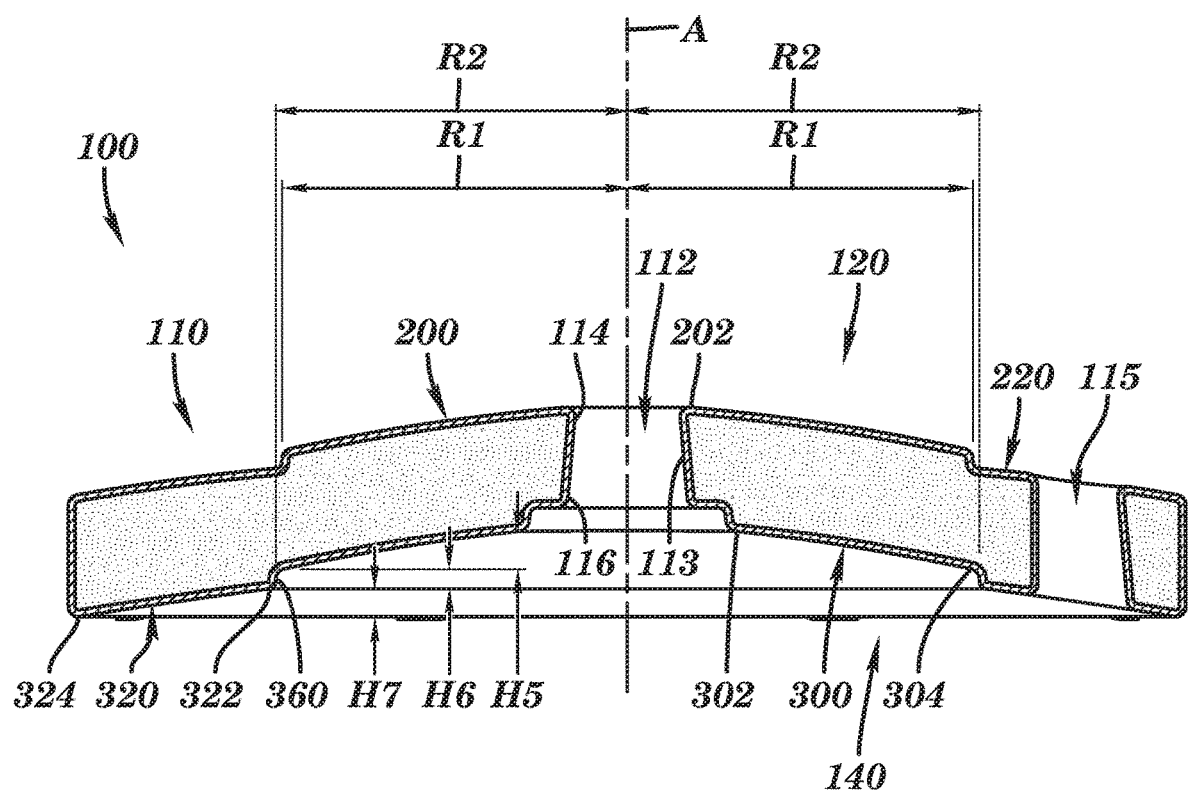
FIG. 5 is a cross-sectional view of the umbrella base taken along line 5-5 in FIG. 2.

As shown in FIG. 5, bottom portion 140 of umbrella base 100 may include recessed central surface 300 having inner surrounding edge 302 disposed at a higher elevation compared to outer surrounding edge 304. For example, inner surrounding edge 302 may be disposed a vertical height H5 above outer surrounding edge 304. In some embodiments, a recessed central surface may angle downwardly from an inner surrounding edge to an outer surrounding edge. For example, a recessed central surface may have a conical surface. In some embodiments, a recessed central surface may define a concave surface. In still other embodiments, a recessed central surface may include a combination of conical and concave surfaces.

Bottom portion 140 of umbrella base 100 may include peripherally-extending surrounding surface 320 having inner surrounding edge 322 disposed at a higher elevation compared to outer surrounding peripheral edge 324. For example, inner surrounding edge 322 may be disposed a vertical height H7 above outer surrounding peripheral edge 324. In some embodiments, a lower peripherally-extending surrounding surface may angle downwardly from an inner surrounding edge to an outer surrounding peripheral edge. For example, a peripherally-extending surrounding surface may have a conical surface. In some embodiments, a lower peripherally-extending surrounding surface may define a concave configuration. In still other embodiments, a lower peripherally-extending surrounding surface may include a combination of conical and concave surfaces. Vertically-extending connecting surface 360 may have a vertical height H6 of about 0.35 inch. Vertical heights H5, H6, and H7 may be the same or different. For example, vertical height H5 may be about 0.66 inch, vertical height H6 may be about 0.35 inch, and vertical height H7 may be about 0.53 inch. In addition, vertically-extending connecting surface 260 of upper portion 120 of umbrella base 100 may be disposed at a radius R1 from a central axis A extending through passageway 112. Vertically-extending connecting surface 360 of bottom portion 14 of umbrella base 100 may be disposed at a radius R2 from axis A. Radius R2 may be greater than radius R1 as described below. For example, radius R1 may be about 6.5 inches, and radius R2 may be about 6.7 inches.

A plurality of feet 305, best shown in FIG. 3, may be spaced apart and extend from and along the peripheral edge of bottom portion 140. Feet 305 may be about 0.38 inch wide, about 1.12 inch long, and about 0.05 inch high. Feet 305 may be positioned on the ground or on a patio. As described below, the feet may be positioned on top of another umbrella base.

Figure 6:
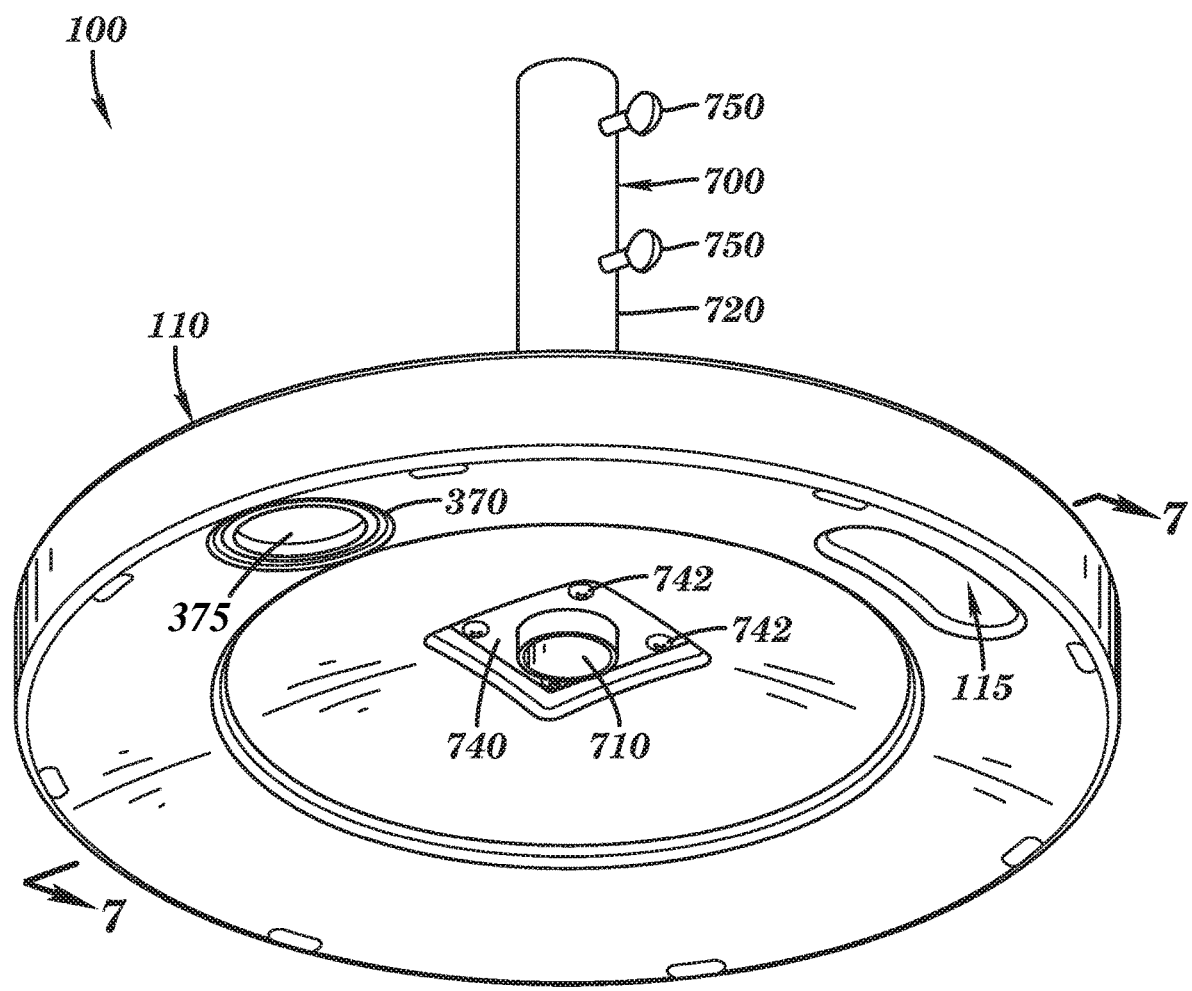
FIG. 6 is an enlarged bottom perspective view of the umbrella base assembly of FIG. 1.
Figure 7:
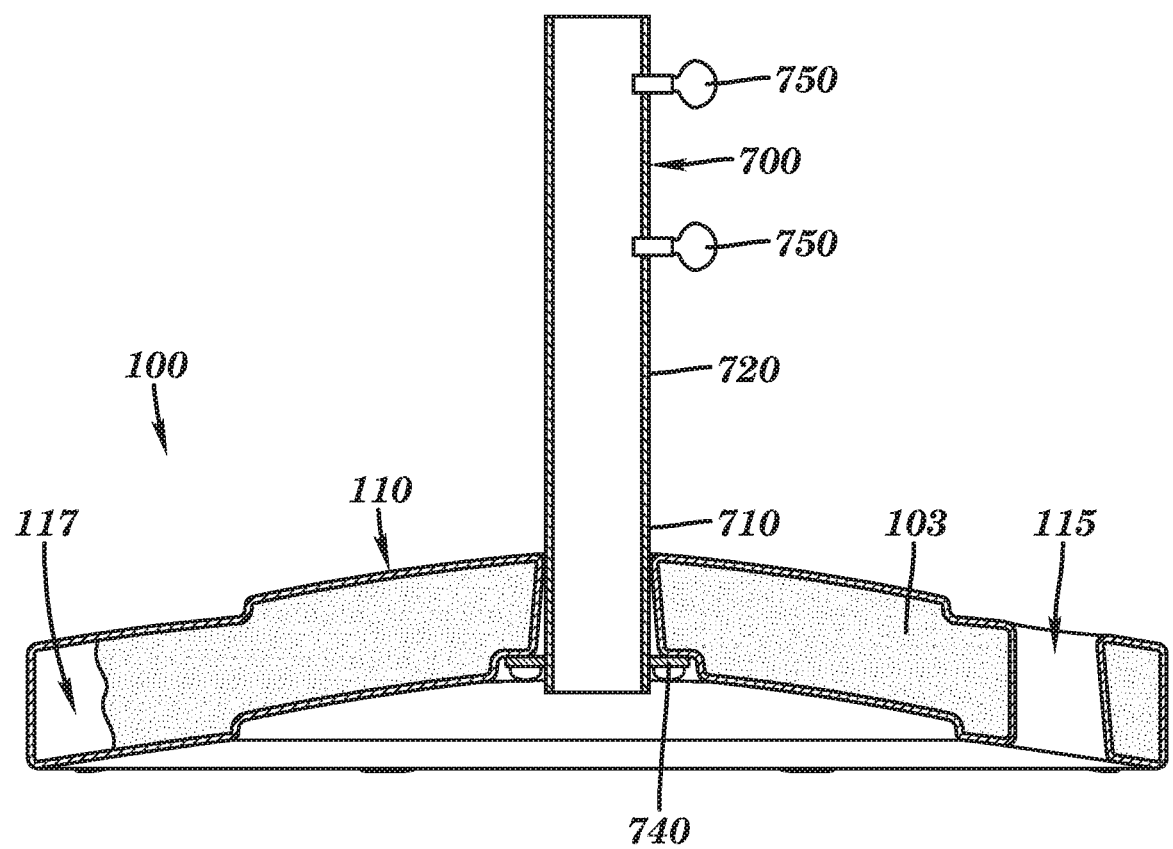
FIG. 7 is a cross-sectional view of the umbrella base assembly taken along line 7-7 in FIG. 6.

With reference again to FIG. 5, body 110 of umbrella base 100 has a generally shallow inverted bowl configuration having a shallow inverted arch cross-section. Body 110 includes a central passageway 112 extending therethrough defined by a sidewall 113 having an upper aperture 114 opening onto inner surrounding edge 202 of raised central surface 200, and a lower aperture 116 opening onto inner surrounding edge 302 of recessed central surface 300. Sidewall 113 may be dispose on an angle so that opening 114 is sized smaller than lower aperture 116. For example, sidewall 113 may be disposed on an angle from vertical of between about 2 degrees and about 6 degrees, between about 3 degrees and about 5 degrees, at about 3 degrees, at about 4 degrees, or at about 5 degrees. The diameter of upper aperture 114 may be about 2 inches and the diameter of lower aperture 116 may be about 2.4 inches. Passageway 112 is operable for receiving base tube assembly 700, as shown in FIGS. 6 and 7, which base tube assembly 700 is sized for receiving lower end 15 (FIG. 1) of elongated pole 14 (FIG. 1) of the umbrella assembly. It will be appreciated that the central passageway may be sized depending on the size of the pole of the umbrella. A plurality of thumb screws 750 are operably rotatable to clamp, lock, and/or secure lower end 15 (FIG. 1) of elongated pole 14 (FIG. 1) of the umbrella assembly.

With reference still to FIGS. 6 and 7, base tube assembly 700 includes a hollow tube 720, a square flange 740, and plurality of thumb screws 750. Square flange 740 may be operably attached to hollow tube 720 such as by welding. The base tube and flange may be fabricated from a metal material such as aluminum. As shown in FIG. 3, recessed central surface 300 may have a recessed square surface 390 surrounding passageway 112. With reference again to FIGS. 6 and 7, central flange 740 of base tube assembly 700 may be operably attached to recessed square surface 390 (FIG. 3) of umbrella base 100 with a plurality of screws 742. A handle passageway 115 may extend between lower peripherally-extending surrounding surface 220 (FIG. 5) of upper portion 120 (FIG. 5) and peripherally-extending surrounding surface 320 (FIG. 5) of bottom portion 140 (FIG. 5).

As best shown in FIG. 7, umbrella base 100 may include a hollow body 110 having an outer surrounding sidewall, which defines the outer surfaces of umbrella base 100 having a cavity 117 therein. Hollow body 110 may be formed from a moldable material such as by rotational molding. For example, a moldable material may be a polymeric material such as polyethylene. A suitable thickness of the sidewall may be about 0.1 inch, 0.2 inch, 0.025 inch, 0.3 inch, or other suitable thickness. Bottom portion 140 (FIG. 3) may include an opening 370 (FIG. 7) for access to the cavity in the hollow body 110. Opening 370 (FIG. 7) may be covered with a plug or cap 375 (FIG. 7). A weighted material 103 (FIG. 7) may be disposed in cavity 117 (FIG. 7). For example, the weighted material may be sand, concrete, or other suitable material.

Figure 8:
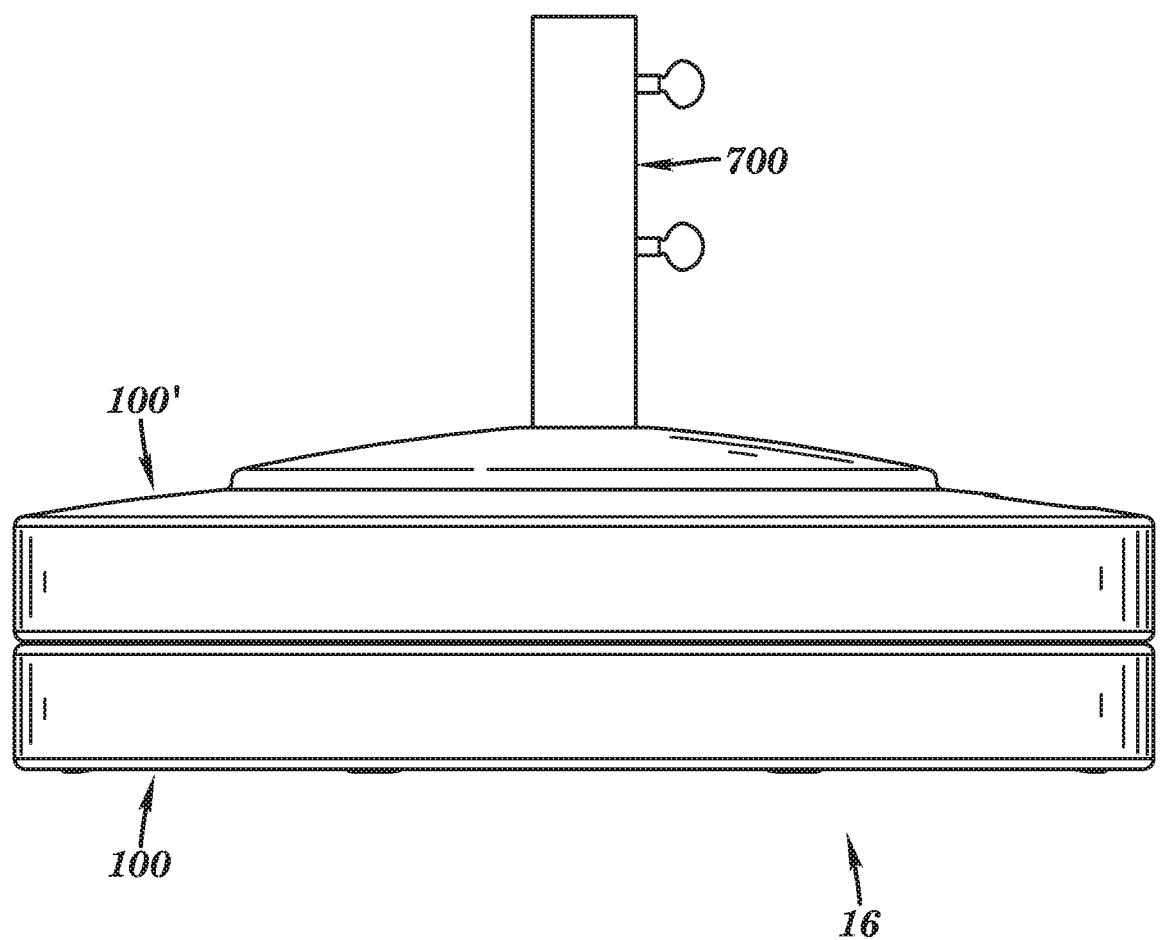
FIG. 8 is an elevational view of the umbrella base assembly of FIG. 6 on which is stacked and nested a second umbrella base according to an embodiment of the present disclosure.
Figure 9:
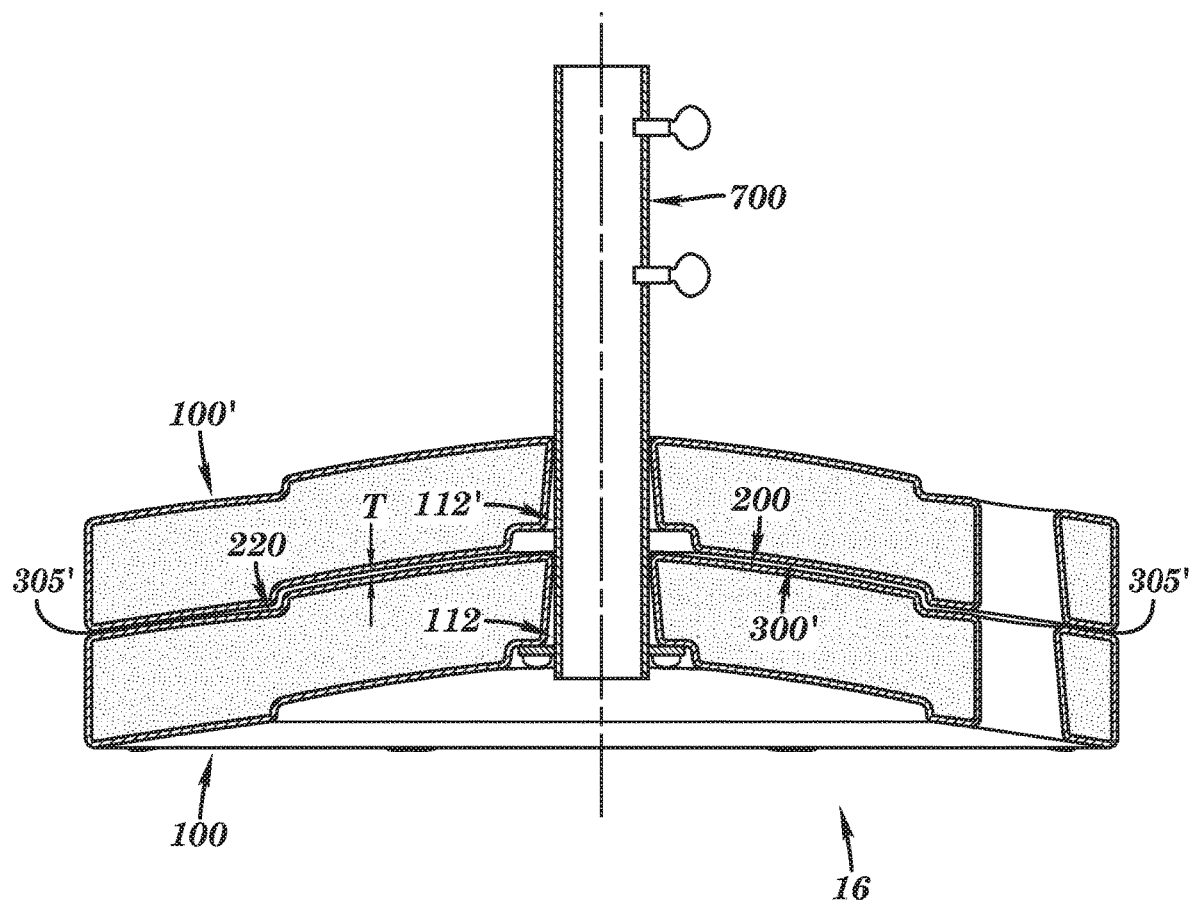
FIG. 9 is a cross-sectional view of the stacked and nested umbrella base and umbrella base assembly of FIG. 8.

FIGS. 8 and 9 illustrate base assembly 16 including umbrella base 100 and base tube assembly 700, along with an additional umbrella base 100' stacked and nested on top of umbrella base 100. As best shown in FIG. 9, raised central portion 200 and recessed central portion 300' are correspondingly sized and configured so that umbrella base 100 and a second umbrella base 100' are vertically nestable and stackable together with the central passageways vertically aligned, and with raised central portion 200 nested in and disposed adjacent to recessed central portion 300'. For example, raised central portion 200 may have a first size or configuration, and recessed central portion 300 and recessed central portion 300' may have a second size or configuration, which second size or configuration is different such as larger than said first size or configuration.

Feet 305' may rest on lower peripherally-extending surrounding surface 220 adjacent the outer surrounding peripheral edge of the upper portion of the umbrella base. For example, raised central portion 200 may be provided with suitable clearance such as spaced from recessed central portion 300' a distance T of about 0.12 inch. In other embodiments, a raised central portion may rest on a recessed central portion. In other embodiments, the vertical sides of the recessed portions and the vertical sides of raised portion may be sized to contact each other such as frictionally engage each other and form a tight engageable fit.

As is illustrated in FIG. 8, the upper portion of umbrella base 100 is obscured and/or hidden by the second stacked and nested umbrella base 100'. For example, only the vertical peripheral edge of umbrella base 100 being observable to a user when second umbrella base 100' is stacked on base 100.

Figure 10:
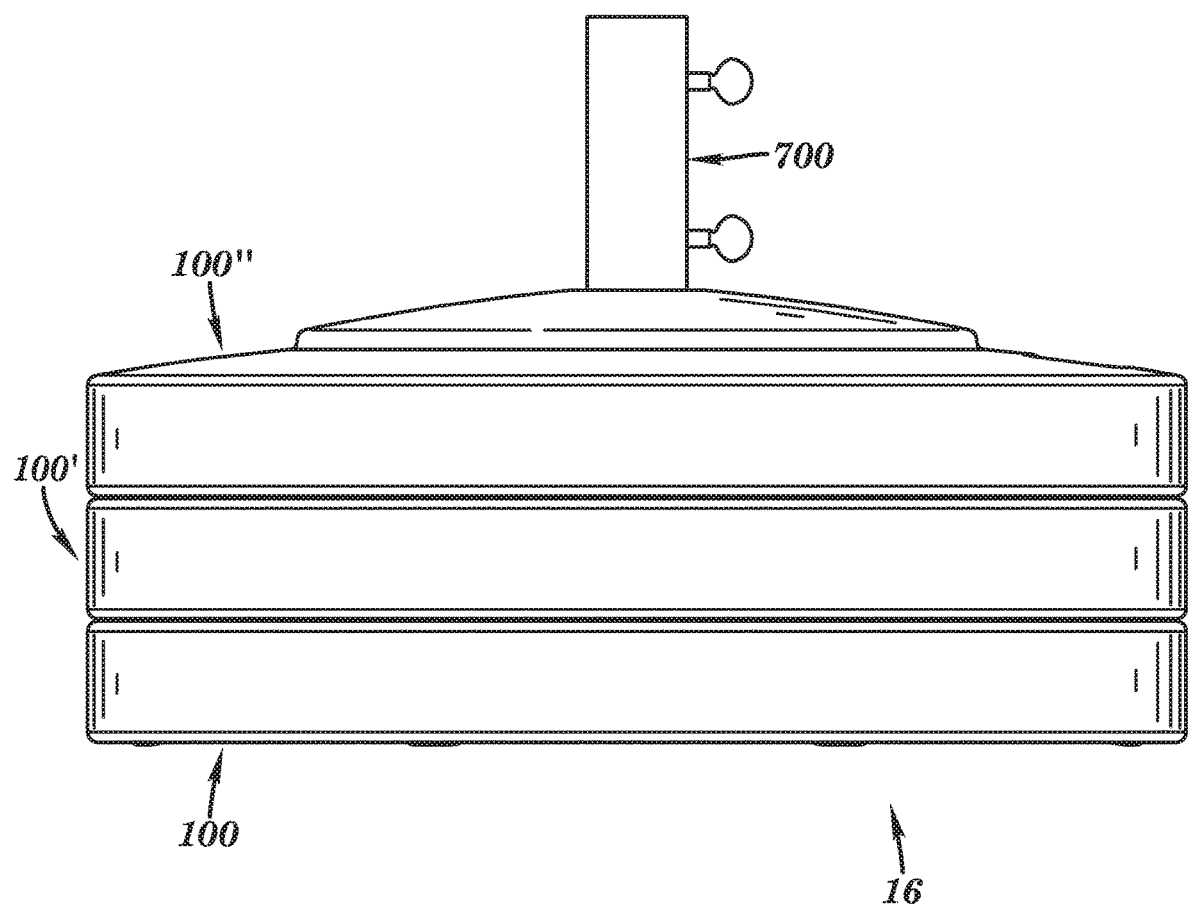
FIG. 10 is an elevational view of the umbrella base assembly of FIG. 6 on which is stacked and nested a second umbrella base and a third umbrella base according to an embodiment of the present disclosure.
Figure 11:
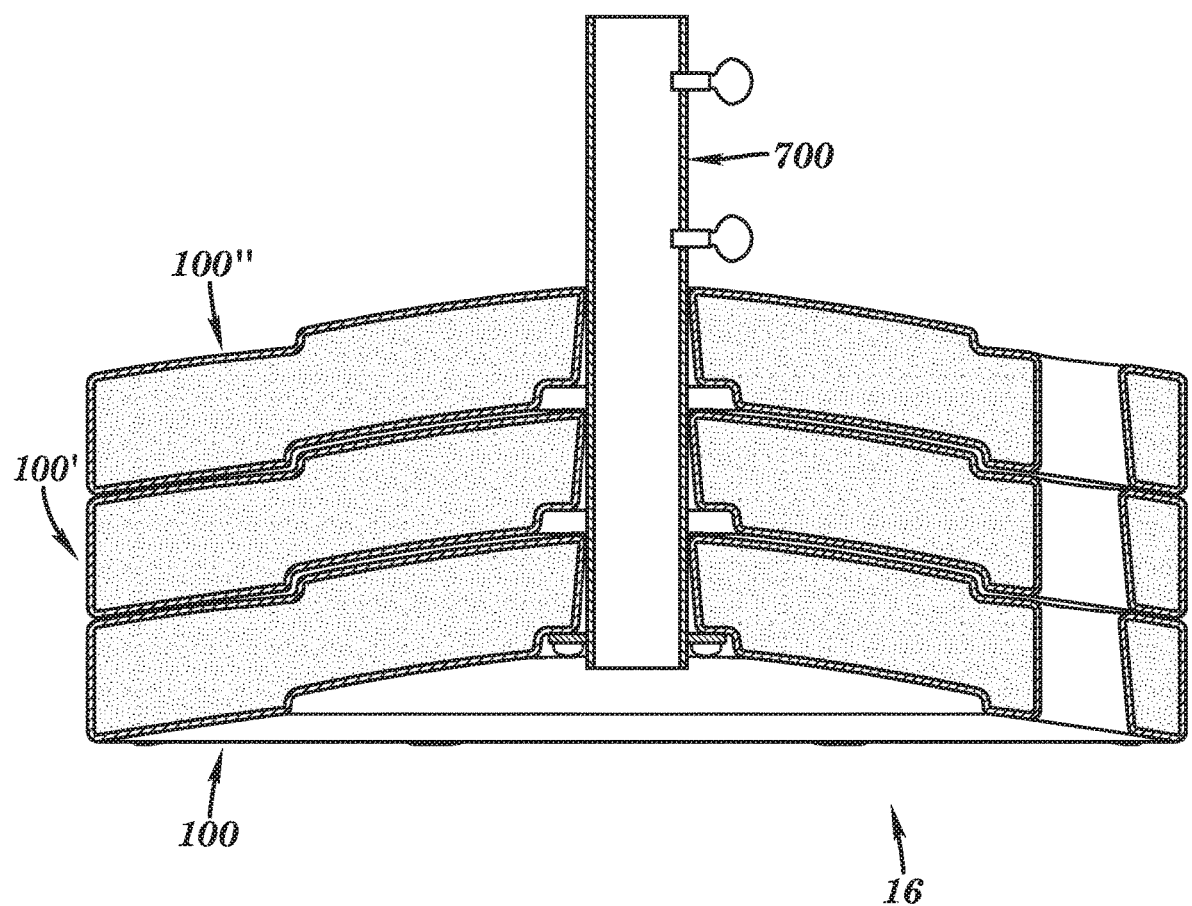
FIG. 11 is a cross-sectional view of the stacked and nested umbrella base and umbrella base assembly of FIG. 10.

FIGS. 10 and 11 illustrate base assembly 16 including umbrella base 100 and base tube assembly 700, along with additional umbrella bases 100' and 100" stacked and nested on top of umbrella base 100. As is illustrated in FIG. 10, the upper portion of umbrella base 100 is obscured and/or hidden by the second stacked and nested umbrella base 100', and the upper portion of second umbrella base 100' is obscured and/or hidden by the third stacked and nested umbrella base 100". For example, only the vertical peripheral edge of umbrella base 100 and the vertical peripheral edge of umbrella base 100' being observable to a user.

Figure 12:
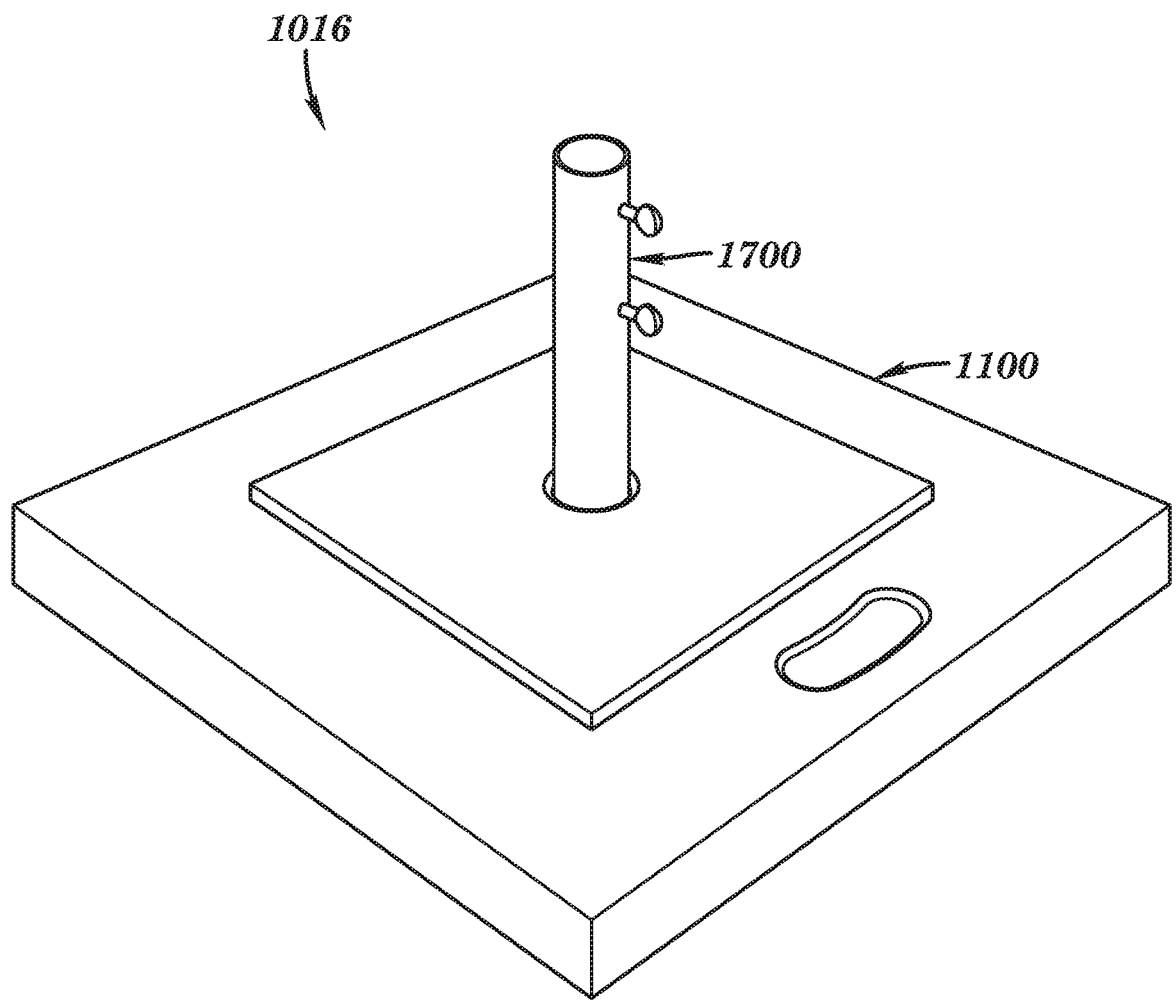
FIG. 12 is a top perspective view of an umbrella base assembly having a square configuration according to an embodiment of the present disclosure.
Figure 13:
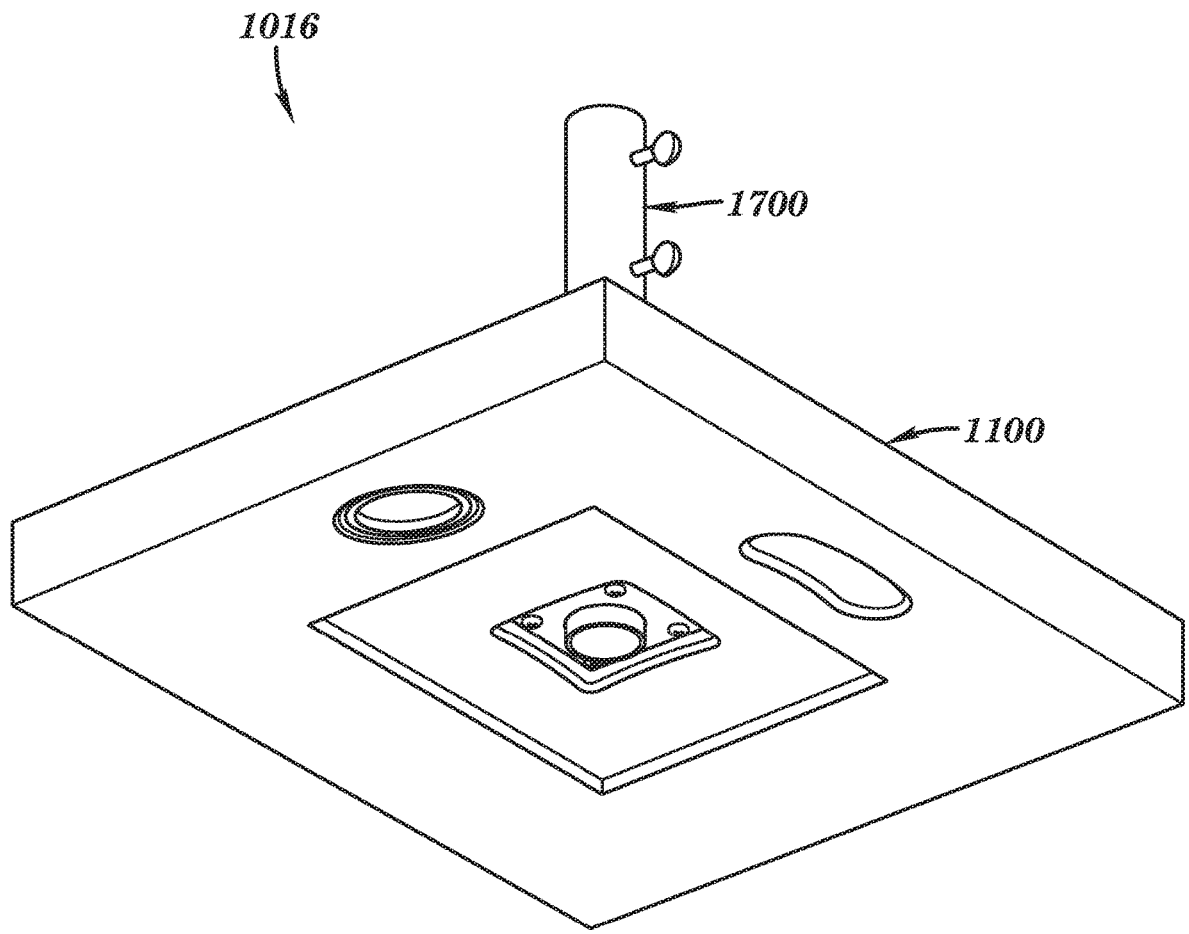
FIG. 13 is a bottom perspective view of the umbrella base assembly of FIG. 12.

FIGS. 12 and 13 illustrates an umbrella base assembly 1016 having one nestable and stackable umbrella base 1100 and a base tube assembly 1700 according to an embodiment of the present disclosure. Umbrella base 1100 may be essentially the same as umbrella base 100, with the exception of having a generally square shaped configuration.

In other embodiments, nestable and stackable umbrella bases according to the present disclosure may include an arched configuration having a plurality of upper concentric differently elevated raised surfaces, and corresponding plurality of lower concentric differently elevated recessed surfaces. The nestable and stackable umbrella base of the present disclosure may provide a generally thin profile which profile can be increased by stacking two or more bases together. In other embodiments, nestable and stackable umbrella bases according to the present disclosure may include generally flat or planar bodies, e.g., no arch cross-section. In other embodiments, nestable and stackable umbrella bases according to the present disclosure may include one or more raised portions disposed on top, and one or more corresponding recessed portions disposed on the bottom. The raised and recessed portions may have any configuration. For example, the raised and recessed portions may be circular, triangular, square, polygonal, nonsymmetrical, or other suitable configuration. A single raised and corresponding single recessed portions may extend over the central passageway, and/or a plurality of raised and corresponding plurality of recessed portions may be disposed around the central opening. While the illustrated umbrella bases may have a generally circular configuration or a generally square configuration, it will be appreciated that umbrella bases of the present disclosure may have any overall suitable configurations such as polygonal, symmetrical or nonsymmetrical overall configurations. The various nestable and stackable umbrellas bases may be configured so that two or more such nestable and stackable umbrellas bases may be operably assembled so that portions of one umbrella base engage, interface, or mesh with or otherwise fit together with portions of another umbrella base when vertically stacked. In some embodiments, the nestable portions may frictionally engage each other to operably releasably connect one umbrella base to another. The nesting portions of the umbrella bases according to the present disclosure may be about 10 percent, about 20 percent, about 30 percent, about 40 percent, about 50 percent, about 60 percent, about 70 percent, between about 30 percent and about 70 percent, between about 40 percent and about 60 percent of the total height of the umbrella base.

The umbrella bases of the present disclosure may have a weight of about 50 pounds and the handle opening may allow for easy handling. A single base assembly may be suitable under a table. For free standing umbrellas, two bases can be stacked for a total of 100 pounds, or three bases can be stacked for a total of 150 pounds. Other weights may be possible such as about 30 pounds, about 40 pounds, about 60 pounds, or other suitable weight. The bases may have any solid color or any of a plurality of different colors.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples in the present disclosure, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A nestable and stackable umbrella base for use with a base tube in supporting a lower end of an elongated support of an umbrella assembly, said umbrella base comprising:
   a body having a central passageway therethrough for receiving the base tube for supporting the lower end of the elongated support of the umbrella assembly;
   said body having an upper surface having a first configuration and a lower surface having a second configuration;
   said body having an outer peripherally-extending surface extending between said upper surface and said lower surface to define an outer surrounding sidewall, and forms a cavity therein;
   said body having an inverted bowl configuration extending from said central passageway to said outer peripherally-extending surface, and said upper surface and said lower surface of said body defining an arch cross-section extending from said central passageway to said outer peripherally-extending surface;
   said first configuration of said upper surface and said second configuration of said lower surface being correspondingly sized and configured so that when a second said umbrella base is vertically stacked on top of and rested on said umbrella base with said central passageways vertically aligned and said outer peripherally-extending surfaces vertically aligned, at least a portion of said first configuration of said upper surface of said umbrella base vertically fits within at least a portion of a second configuration of a lower surface of the second said umbrella base; and said first configuration of said upper surface and said second configuration of said lower surface being correspondingly sized and configured so that when said umbrella base is vertically stacked on top of and rested on the second said umbrella base with said central passageways vertically aligned and said outer peripherally-extending surfaces vertically aligned, at least a portion of a first configuration of an upper surface of the second said umbrella base fits within at least a portion of said second configuration of said lower surface of said umbrella base.

2. The umbrella base of claim 1 wherein said body comprises a constant vertical thickness between said upper surface and said bottom surface from said central passageway to said peripherally-extending surface.

3. The umbrella base of claim 1 wherein said first configuration of upper surface comprises a raised central upper surface, and said second configuration of said lower surface comprises a correspondingly sized and configured recessed central surface.

4. The umbrella base of claim 1 wherein said first configuration of said upper surface comprises a convex raised central upper surface and a peripherally extending surrounding convex surface, and said second configuration of said lower surface comprises a correspondingly sized and configured concave recessed central surface and a peripherally extending surrounding concave surface.

5. The umbrella base of claim 1 wherein said central passageway comprises an upper opening and a lower opening, and wherein said lower opening being larger than said upper opening.

6. The umbrella base of claim 1 wherein said lower surface of said body comprises a recessed square surface disposed around said central passageway.

7. The umbrella base of claim 1 further comprising a base tube assembly extending through said central passageway and operably connected to said body.

8. The umbrella base of claim 1 wherein said body comprises a second passageway extending therethrough having an upper aperture opening onto said upper surface and a lower aperture opening onto said lower surface, and wherein said second passageway is sized for use as a handle by a user.

9. The umbrella base of claim 1 wherein said body comprises a polymeric material.

10. The umbrella base of claim 9 further comprising a weighted material disposed in said cavity of said body.

11. The umbrella base of claim 1 further comprising the second said umbrella base.

12. The umbrella base of claim 1 further comprising the umbrella having the elongated member.

13. A nestable and stackable umbrella base for use with a base tube in supporting a lower end of an elongated support of an umbrella assembly, said umbrella base comprising:

a body having an upper portion, a bottom portion, and a peripherally-extending portion extending between said upper portion and said bottom portion to define an outer surrounding sidewall, and forms a cavity therein;

said upper portion comprising a raised upper central portion, a recessed lower surrounding portion, and an outer vertically-extending surface portion disposed between said raised upper central portion and said recessed lower surrounding portion;

said bottom portion comprising a recessed lower central portion, a surrounding portion, and an inner vertically-extending surrounding portion extending between said recessed lower central portion and said surrounding portion;

said body having a passageway extending therethrough having an upper aperture opening onto an upper surface of said raised upper central portion and a lower aperture opening onto a lower surface of said recessed lower central portion, said passageway operable for receiving the base tube for receiving the lower end of the elongated support of the umbrella assembly;

said raised upper central portion extending from said upper aperture to said outer vertically-extending surrounding portion a first distance, and said recessed lower surrounding portion extending from said outer vertically-extending surrounding portion to said peripherally-extending portion a second distance less than said first distance;

said recessed lower central portion extending from said lower aperture to said inner vertically-extending surrounding portion a third distance, and said surrounding portion extending from said inner vertically-extending surrounding portion to said peripherally-extending portion a fourth distance less than said third distance; and said raised central portion and said recessed central portion being correspondingly sized and configured so that when said umbrella base and a second said umbrella base are vertically stacked together with said passageways vertically aligned, a lower surrounding portion of a bottom portion of the second said umbrella base is disposable adjacent to said recessed lower surrounding portion of said upper portion of said umbrella base, and said raised upper central portion of said umbrella base is disposed in a recessed lower central portion of the second said umbrella base.

14. The umbrella base of claim 13 wherein when said umbrella base and the second said umbrella base are vertically stacked together with said passageways vertically aligned, said upper portion of said umbrella base is obscured from view by an observer by the second said umbrella base.

15. The umbrella base of claim 13 wherein said raised upper central portion comprises an angled upper surface portion, and said recessed lower central portion comprises an angled recessed lower central portion.

16. The umbrella base of claim 13 wherein said raised upper central portion comprises a convex upper surface, and said recessed lower central portion comprises a concave recessed lower central surface.

17. The umbrella base of claim 13 wherein said recessed lower surrounding portion of said upper portion comprises a convex lower surrounding surface, and said surrounding portion of said bottom portion comprises a concave surrounding surface.

18. The umbrella base of claim 13 wherein said outer vertically-extending surrounding portion comprises a circular outer vertically-extending surrounding edge, and said inner vertically-extending surrounding portion comprises a circular inner vertically-extending surrounding edge.

19. The umbrella base of claim 13 wherein said peripherally-extending portion comprises a cylindrical outer peripheral surface.

20. The umbrella base of claim 13 wherein said body comprises a second passageway extending therethrough having an upper aperture opening onto an upper surface of said recessed lower surrounding portion and a lower aperture opening onto a lower surface of said surrounding portion, and wherein said second passageway is sized for use as a handle by a user.

21. The umbrella base of claim 13 wherein said upper aperture of said passageway comprising a first size, said lower aperture of the passageway comprising a second size larger than said first size.

22. The umbrella base of claim 13 further comprising a base tube assembly receivable in said passageway and attachable to said body, said base tube assembly sized for receiving the lower end of the elongated support of the umbrella.

23. The umbrella base of claim 22 wherein said body comprises a recessed planar square surface disposed around said lower aperture of said passageway.

24. The umbrella base of claim 22 wherein said recessed lower central portion comprises a recessed planar surface disposed around said passageway, and wherein said base tube assembly comprise a hollow cylinder having a flange receivable in and operably attachable to said recessed planar surface.

25. The umbrella base of claim 13 wherein said bottom portion comprises a plurality of projections extending downwardly from said surrounding portion of said bottom portion and spaced apart adjacent to said peripherally-extending portion.

26. The umbrella base of claim 13 wherein said body comprises a polymeric material.

27. The umbrella base of claim 26 further comprising a weighted material disposed in said cavity of said body.

28. The umbrella base of claim 27 wherein said body comprises a port for introducing said weighted material into said body, and a plug for sealing said port.

29. The umbrella base of claim 13 further comprising an umbrella having the elongated member.

30. The umbrella base of claim 1 wherein when said umbrella base and the second said umbrella base are vertically stacked together with said central passageways vertically aligned, said upper portion of said umbrella base is obscured from view by an observer by the second said umbrella base.

31. The umbrella base of claim 30 wherein a constant surrounding gap is able to be disposed between a lower edge of said outer peripherally-extending surface of said umbrella base and an upper edge of said outer peripherally-extending surface of the second said umbrella base.

32. The umbrella base of claim 13 wherein-said body comprises a constant vertical thickness from said central passageway to said peripherally-extending portion.

33. The umbrella base of claim 14 wherein a constant surrounding gap is able to be disposed between a lower edge of said peripherally-extending portion of said umbrella base and an upper edge of said peripherally-extending portion of the second said umbrella base.

* * * * *